Patented May 18, 1948

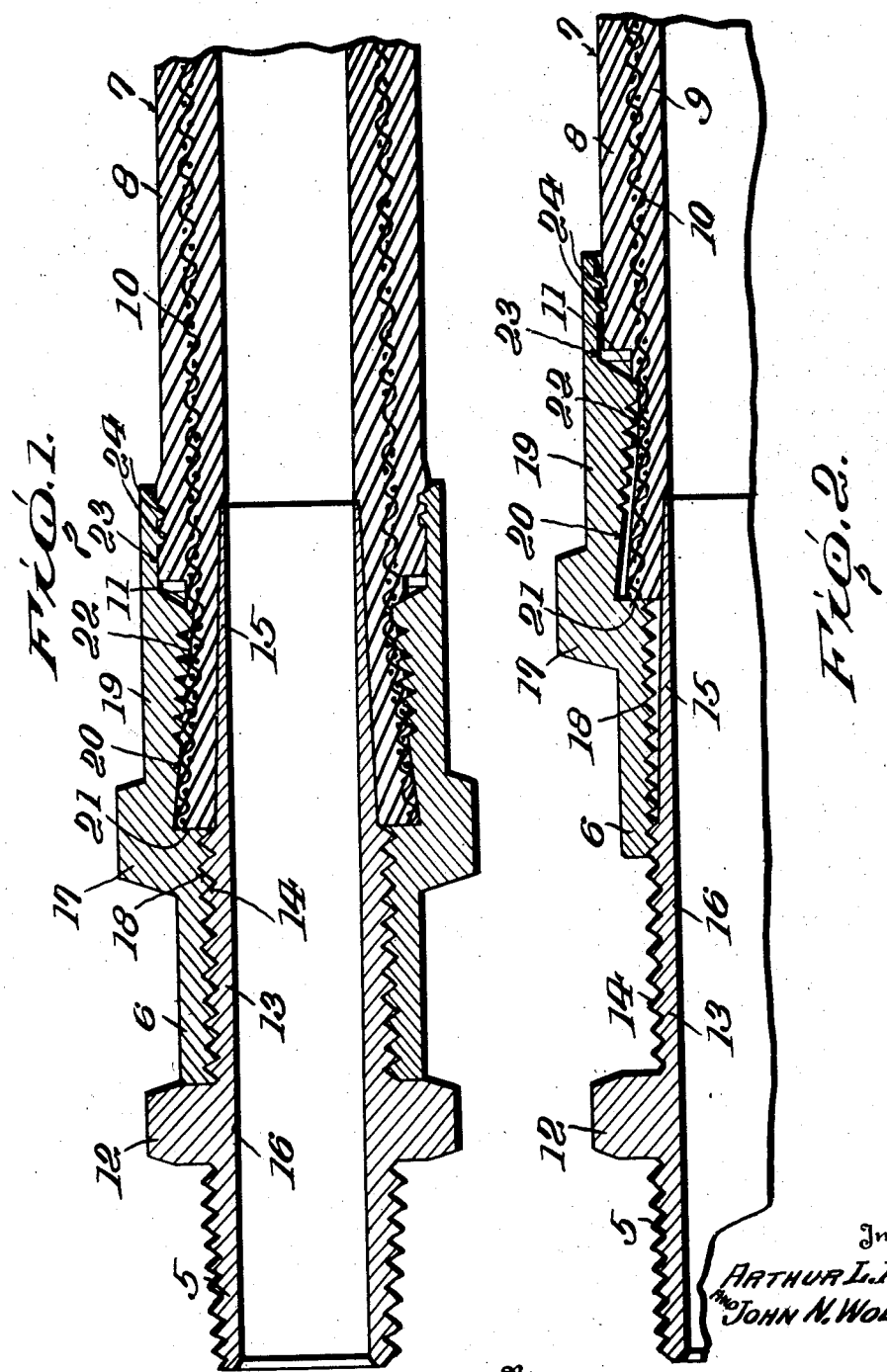

2,441,718

UNITED STATES PATENT OFFICE 2,441,718

TWO-PIECE HOSE COUPLING

Arthur L. Parker and John N. Wolfram, Cleveland, Ohio, assignors to The Parker Appliance Company, Cleveland, Ohio, a corporation of Ohio Application February 18, 1944, Serial No. 522,897

1 Claim. (Cl. 285—84)

The invention relates generally to coupling structures and primarily seeks to provide a novel two-piece coupling structure adapted for being securely clamped on an end of a flexible, high pressure hydraulic hose in a manner for assuring against pulling out of the hose and also against leakage between the hose end and the coupling structure.

Hose structures of the character stated usually are formed to include inner and outer layers or tubes of rubber, or a suitable substitute, and an interposed layer of a reinforcing material such as steel braid. It is an object of the invention to provide a novel coupling structure having provision for effecting a clamping engagement with an end of a hose stripped down so that the clamping engagement is directly with the reinforcing steel braid, and in which means is provided for sealing the coupling against ingress of moisture or debris so as to protect the exposed steel braid against rust and corrosion.

In its more detailed nature the invention resides in providing a coupling structure comprising threadably connected nipple and clamp sleeve members, the nipple having a tapered male extension insertible into the hose end to be clamped, and the clamp sleeve having an inwardly flared bore forming a chamber surrounding the tapered male extension when the nipple and sleeve are assembled and defined in part by a ribbed wall disposed to directly engage in clamping contact with the steel braid exposed by stripping from the hose end being clamped the outer layer or covering, said sleeve also having a counterbore in which to receive the non-stripped end portion of the hose in a manner for hiding the exposed steel braid and sealing the same against ingress of moisture or debris.

An object of the invention is to provide a coupling of the character stated in which the flare walled chamber in the clamp sleeve and the tapered male extension of the nipple are so related as to cause the stripped end of the hose to flare outwardly toward its end as it is being clamped, thereby to securely hold the hose against pulling out, and also to provide a hose end grip of maximum intensity at the small diameter end portion of the flare wall.

Another object of the invention is to provide a coupling of the character stated in which the flared wall of the chamber in the clamp sleeve is provided with grooves forming ribs which are embedded in the exposed steel braid at the stripped end of the hose when the coupling is assembled, the rib forming grooves being deepest adjacent the small diameter end of said flared wall.

Still another object of the invention is to provide a coupling of the character stated in which the clamp sleeve also has a counterbore at its end extremity in which to receive the full diameter of the non-stripped end portion of the hose and having therein inwardly directed ribs adapted to become embedded in the external surface of the hose as it is expanded by insertion of the tapered male extension of the nipple.

With the above and other objects in view that will hereinafter appear, the nature of the invention will be more clearly understood by reference to the following detailed description, the appended claim, and the several views illustrated in the accompanying drawings.

In the drawings:

Figure 1 is a longitudinal sectional view illustrating a coupling embodying the invention.

Figure 2 is a fragmentary longitudinal sectional view showing the coupling in the partially assembled state.

The coupling herein disclosed as an example of embodiment of the invention, includes a nipple member generally designated 5 and a socket or clamp sleeve member generally designated 6, said nipple and sleeve members being constructed in a manner for cooperating, when threadably connected, in securely clamping between them an end of a flexible, high pressure hydraulic hose generally designated 7. Such hose usually includes an outer layer 8 of rubber, an inner layer 9 of rubber and an interposed reinforcing braid, usually formed of wire. Obviously other forms of hose structure can be clamped in the coupling herein disclosed, but it is preferred that the type of hose above described be used so that the end portion thereof can be stripped as at 11 to lay bare the wire braid 10 for direct clamping engagement by the clamp sleeve.

The nipple member generally designated 5 has a non-circular or nut portion 12 providing an abutment shoulder and a male extension 13 which is externally threaded as at 14 and terminates in a thin, gradually tapered end portion 15. The nipple member also is equipped with a flow bore 16 which is of substantially the same internal diameter as the internal diameter of the hose.

The socket or clamp sleeve member generally designated 6 includes a non-circular or nut portion 17 and is internally threaded as at 18 for threadable engagement with the externally threaded portion 14 of the nipple member. The sleeve also includes a cylindrical extension 18 having an inwardly flared bore 20 in which to receive the stripped end 11 of the hose which is to be clamped. The flared bore 20 terminates in an abutment or end wall 21 and the inner portion thereof adjacent said wall is smooth, as will be apparent by reference to Figure 2. Toward its small diameter end the flared bore 20 is provided with grooves of gradually increasing depth as they approach proximity to the smallest diameter of the bore, and these grooves provide hose gripping ribs 22 for embedding in and gripping directly against the bored hose reinforcing braid 10 at the stripped end 11 of the hose in the manner clearly illustrated in Figure 1.

The clamp sleeve 19 also is equipped with a counterbore 23 for receiving the non-stripped or full diameter end portion of the hose, and this counterbore is equipped with inwardly directed ribs which are embedded in the external surface of the hose when the coupling is fully assembled in the manner illustrated in Figure 1.

In the assembling of the herein disclosed coupling, the stripped hose end 11 is inserted into the inwardly flared clamp sleeve bore 20 in abutting relation with the end wall 21 therein. The tapered end extremity 15 of the nipple member is then inserted in the end of the hose and the nipple and the clamp sleeve are thereadably engaged in the manner illustrated in Figure 2. As the clamp sleeve and the nipple member are threaded together, projection of the tapered end 15 of the nipple into the hose causes the stripped end of the hose to be expanded into tight contact in the flared bore 20 of the sleeve. Since the flared bore in the sleeve is disposed at a greater angle with respect to the axis of the hose than is the external tapered surface of the nipple projection 15, a gripping area of maximum intensity will be provided adjacent the small diameter end of the flared bore, or in other words the end portion provided with the gripping ribs 22. Because of the outward flaring of the stripped end of the hose in the fully clamped coupling, it is extremely difficult if not impossible, to pull the hose out of the coupling. It will be observed by reference to Figure 1 that the end extremity of the nipple extends into the clamp sleeve bore 23 and serves to expand the hose and tightly press the external surface thereof against the wall of the counterbore so as to cause the counterbore ribs 24 to be embedded in the external surface of the hose. Thus in addition to providing a tight grip on the exposed steel braid 10 at the stripped end of the hose, the embedding of the counterbore ribs 24 contributes to the tight gripping of the hose end in the coupling. The tight gripping of the non-stripped, full diameter hose end portion in the counterbore 23 serves effectively to seal the coupling against the ingress of moisture or debris and assures against weakening of the hose structure by rusting or corroding of the exposed steel braid 10.

While one form of the invention has been shown for purposes of illustration, it is to be clearly understood that various changes in the details of construction and arrangement of parts may be made without departing from the spirit and scope of the invention as defined in the appended claim.

We claim:

A coupling for a hose having an interposed reinforcing braid and an end portion to be clamped which is stripped down to said braid, said coupling comprising a nipple member having an abutment shoulder and a contiguous externally threaded extension terminating in a reduced tapered end portion insertible in the end of the hose, said nipple having a bore therethrough of substantially the same diameter as the inside diameter of the hose, and a clamp sleeve threadably mounted on said externally threaded extension in juxtaposition of said abutment shoulder and including an intermediate inwardly flared bore section providing, with the tapered end section, an annular chamber wherein the stripped hose end is received and clamped by the flared bore wall against the tapered end portion inserted therein, said sleeve also having an end counterbore for receiving the whole diameter of the hose adjacent the stripped end thereof and in which the hose is securely clamped and sealed by the spreading action incident to insertion of the tapered extension in the hose to prevent access of moisture to the braid at the stripped portion.

ARTHUR L. PARKER.
JOHN N. WOLFRAM.

REFERENCES CITED

The following references are of record in the file of this patent:

UNITED STATES PATENTS

| Number | Name | Date |
|---|---|---|
| Re. 19,865 | Eastman | Feb. 25, 1936 |
| 1,738,915 | Mueller | Dec. 10, 1929 |
| 2,333,350 | Weatherhead | Nov. 2, 1943 |

FOREIGN PATENTS

| Number | Country | Date |
|---|---|---|
| 475,777 | Great Britain | Nov. 25, 1937 |